United States Patent [19]

Miller

[11] 4,079,821

[45] Mar. 21, 1978

[54] ELECTROMAGNETIC CLUTCH

[75] Inventor: Donald Leroy Miller, Horseheads, N.Y.

[73] Assignee: Facet Enterprises, Inc., Tulsa, Okla.

[21] Appl. No.: 686,854

[22] Filed: May 17, 1976

[51] Int. Cl.² .............................................. F16D 27/06
[52] U.S. Cl. ..................................... 192/84 C; 192/54
[58] Field of Search ........................... 192/84 C, 70, 54

[56] References Cited

U.S. PATENT DOCUMENTS

| 2,161,359 | 6/1939 | Lambert | 188/72.4 X |
|---|---|---|---|
| 2,401,003 | 5/1946 | Lear | 192/84 C |
| 2,662,624 | 12/1953 | Giffen | 192/54 X |
| 2,728,429 | 12/1955 | Kershner | 192/54 X |
| 2,801,719 | 8/1957 | Clerk | 192/70 X |
| 2,937,729 | 5/1960 | Sperr, Jr. | 192/84 C |
| 3,044,594 | 7/1962 | Bernard | 192/84 C |
| 3,251,441 | 5/1966 | Winter | 192/54 X |
| 3,446,322 | 5/1969 | Wrensch | 192/84 C |
| 3,584,715 | 6/1971 | Miller | 192/84 C |

FOREIGN PATENT DOCUMENTS

| 682,161 | 3/1964 | Canada | 192/84 C |

Primary Examiner—Irwin C. Cohen
Attorney, Agent, or Firm—Remy J. VanOphem

[57] ABSTRACT

A single surface electromagnetic clutch or braking device is disclosed which transmits torque from an input means to an output means utilizing a plurality of spherical members located in mutually opposing conical recesses within the output member and the armature, respectively. The maximum amount of torque is translated from the input means to the output means directly through the spherical members without the need of a secondary frictional torque translating surface.

11 Claims, 2 Drawing Figures

ELECTROMAGNETIC CLUTCH

BACKGROUND OF THE INVENTION

1. Field of the Invention

The invention relates to friction clutches and brakes of the type in which a single surface electromagnetic clutch has an annular armature disposed coaxially with a torque translating means interposed an input and output means. The armature being relatively displaceable in the axial direction of the clutch or brake, engagement of the torque translating means being initiated upon the energization of the electromagnet so as to attract the armature.

2. Description of the Prior Art

Electromagnetic clutches or brakes as used heretofore generally have an input or driving means coaxially disposed with respect to an output or driven means. Interposed said driven and driving means is a friction means utilizing frictional surfaces to translate the torque from the input or driving means to the output or driven means. This frictional torque transmitting arrangement is generally obtained through a series of annular plates or discs with frictional material mounted to the outer periphery of the plate. These plates are by some means axially displced to enable the frictional material portion of the plates to come into contact with each other thereby either translate torque from the input to the output means in the case of a clutch, or to absorb torque in the case of a brake arrangement. The axial movement of the friction plates or discs is accomplished directly or indirectly through the use of a plurality of spherical members located in a depression within the friction plates. Relative angular movement between the pressure plates causes the ball to follow a directed path along this depression resulting in the pressure plates moving in an axial direction thereby allowing the frictional surfaces at the outer periphery of the plates to come into contact with one another and providing a clutching or braking action. In all of the prior art embodiments, the spherical members are utilized to obtain axial movement of the friction plates and the axial movement of these friction plates causes the frictional surfaces to come into engagement and thereby, through these frictional surfaces, a torque is translated from the input to the output means. Such prior art as U.S. Pat. No. 2,866,528 by J. W. Jacobs, entitled "Clutch for Refrigeration Apparatus"; 2,801,719, by R. D. Clark, entitled "Electromechanically Actuated Friction Brake or Clutch"; and 2,161,359 by H. T. Lambert, entitled "Brake Construction"; are examples of where a plurality of spherical members located in a pre-defined depression are used primarily as a means of obtaining axial displacement of an arrangement of annular plates to obtain a secondary clutching or braking action through engagement of mutually opposing frictional surfaces, yet the spherical members are not required to contribute significantly to the translation of torque from the input to the output means. The basic reason for the prior art avoiding the use of the spherical members to translate torque in clutches or brakes is the fact that it is well known in the art that a spherical member riding between two inclined planes can easily lock up or freeze and thereby prevent the torque carrying device from disengaging. It is because of this past problem that the prior art has chosen to rely on a secondary frictional arrangement, namely, the mutually opposing frictional surfaces of the annular plate members to transfer or absorb torque as shown by the prior art. Further, because of this prior identified problem, some of the prior art has attempted to avoid this problem by constructing the depressions in such a way whereby the spherical members are forced to move in a single specific direction of rotation and thereby avoid the lock up problem. This is exhibited in FIGS. 2 and 3 of U.S. Pat. No. 2,866,528. In other cases, such as U.S. Pat. No. 2,801,719, a locator plate is utilized to guide the spherical members in circular holes and prevent the spherical members from assuming a position on the inclines of the depressions that would cause the brake or clutch assembly to lock up and thereby prevent the frictional surfaces from disengaging. Other prior art such as U.S. Pat. No. 2,161,359 utilizes a series of compression springs to insure that after the spherical members perform the function of causing axial movement of the frictional plates, the spherical members do not lock up and return to their initial position. This configuration, of course, affects the torque output of the clutch or brake in that the force generated by the compressed coil spring must be overcome before the frictional surfaces can be engaged and, also, this force opposes the clutching force.

SUMMARY OF THE INVENTION

The present invention relates to a single surface electromagnetic clutch or braking device for transmitting torque from an input means to an output means which utilizes a plurality of spherical members located in mutually opposing conical recesses as the sole direct means of translating the maximum torque. The actuating means includes an electromagnetic winding, an armature coaxially disposed with the input means, the armature being responsive to the electromagnetic winding when actuated, and further being axially movable with respect to the input and output means. The clutch or braking device further has a plurality of spherical members located between the armature and the output means as the sole torque translating members. The spherical members are disposed in a plurality of mutually opposing conical cross-sectional depressions in the armature as well as the output member of the output means. The maximum amount of torque is translated from the input means to the output means directly through the spherical members without the need of a secondary surface and, further, eliminates the prior art problem of the spherical member locking up and being unable to return to its initial position, also the prior art requirement of restricting the movement of the spherical members in a specific direction is no longer necessary.

It is, therefore, a primary object of this invention to provide a single surface electromagnetic clutch or brake having more stable and improved dynamic torque characteristics by utilizing a plurality of spherical members to translate the torque from an input to an output means.

It is a further object of this invention to provide an electromagnetic clutch or brake that has a torque output which is not adversely effected by wear at the torque transmitting surfaces over long periods of time. Thus, a strong magnetic engaging force is guaranteed regardless of the wear exhibited by the principle torque transmitting members.

Another object of this invention is to provide an electromagnetic clutch or brake in which the electromagnetic engaging force is unaffected by wear exhibited on torque carrying members.

It is a further object of this invention to provide an electromagnetic clutch or brake wherein the magnetic poles bear evenly on the armature, thereby deriving an exceptionally good torque-speed-time relationship not obtainable in the prior art.

It is a further object of this invention to provde an electromagnetic clutch or brake wherein the torsional forces are maintained at all times normal to the surfaces transferring said torsional forces from the input to the output means.

Still a further object of this invention is to provide an electromagnetic clutch or brake wherein the sole direct means for transmitting torque from the input means to the output means is a plurality of spherical members confined within mutually opposing conical recesses, yet totally free to find their own center of translation.

Other objects and advantages of this invention will become more apparent from the following detailed description taken in conjunction with the accompanying drawings.

DESCRIPTION OF THE PREFERRED EMBODIMENT

Figure 1:
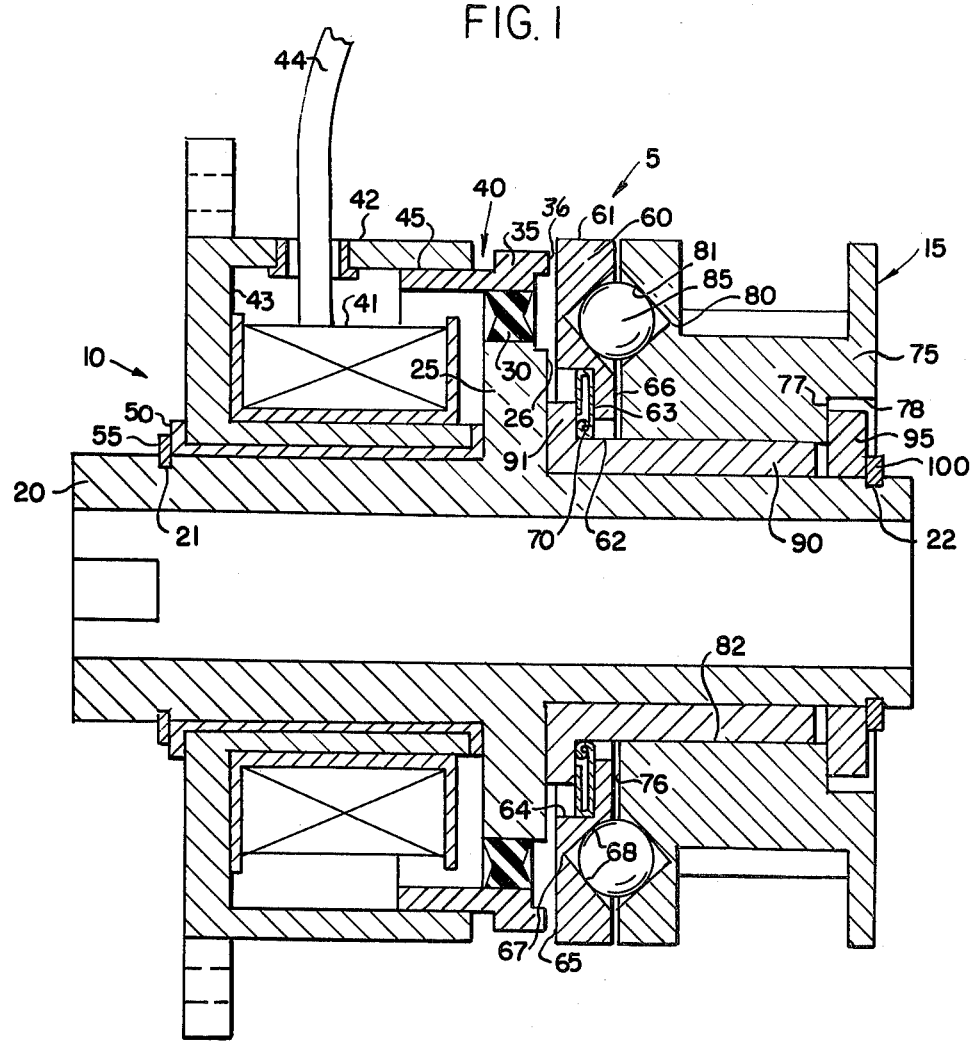
FIG. 1 is a cross sectional view of the preferred embodiment of the invention showing the clutch elements in the disengaged position.

Referring to FIG. 1, there is shown an electromagnetic friction device 5 adapted to transmit torque from an input means 10 to an output means 15 thereby driving the output means and any elements attached thereto, such as an industrial cooling fan. The output means could be coupled to a secondary shaft or some other device which would utilize the rotative power transferred to the output means by the input shaft 20 through a torque translating means. The device can also be utilized as a braking device. This would require that the input shaft 20 be fixed and the output means attached to a rotating element. Upon energizing the electromagnet, the torque translating means would bring the output means to a complete stop.

The electromagnetic device 15 is comprised of a generally rotatable driving motor input means 10, including an input shaft 20, comprised of three concentric annular elements 25, 30, 35 which form an integral rotatable body. In order to establish two separate flux conducting surfaces, the radially inner annular member 25 of the input means 10 is separated from the radially outer annular member 35 of the input means by a non-conductive ring member 30. This specific feature of electromagnetic clutches, that is, establishing two poles, is a well known principle in the art. The non-conductive ring member 30 may be manufactured from various non-magnetic materials, such as stainless steel, brass, or a resilient material as shown, etc. The annular inner member 25 of the input means 10 is preferably integral with the input shaft 20 although the inner member could be a separate member properly mounted to such shaft by any suitable means. By having the inner member 25 integral with the input shaft 20, any alignment problems of the input means with respect to the armature and output means are minimized. The inner member 25 has a magnetic pole face 26 which is normal to the input shaft axis and parallel to the annular armature opposite face or rear face. The outer member 35 of the input means 10 also has a magnetic pole face 36 disposed normal to the clutch axis and parallel to the annular opposite armature face or rear face.

The clutch actuating means 40 comprises an electromagnetic winding or coil 41 and a flux conducting housing 42 for the electromagnetic winding. The electromagnetic winding or coil 41 is disposed within a cavity 43 of the housing 42 and is contained therein by any suitable adhesive, such as epoxy. The coil 41 may be manufactured from copper wire or other suitable material and is suitably connected to a d.c. power source and an electrical control means (not shown). The housing 42 is axially and rotatably fixed with respect to the annular inner member 25, annular outer member 35 and input shaft 20. A friction free bearing 50 is maintained between the fixed housing 42 of the electromagnetic winding 41 and the input shaft 20 to provide for rotatable movement of the shaft with respect to the housing 42 and, further, a sliding electromagnetically conductive contact 45, which is well known in the art, is provided between the annular outer member 35 and the electromagnetic housing 42.

The preferred embodiment shown in FIG. 1 utilizes an integral construction for the annular inner member 25 as well as the input shaft 20. This facilitates mounting of the electromagnetic housing. The bearing member 50 which holds the electromagnetic housing 42 abuts the annular inner member 25 at one end and the opposite end of the bearing member 50 is contained through the use of a retaining member 55 which is located in a groove 21 within the input shaft 20. The retaining member 55 maintains the electromagnetic housing 42 and bearing sleeve 50 in an axially fixed position with respect to the annular inner 25 and outer 35 members.

The clutch driven or output means essentially includes an armature 60, a resilient member 70, an output or driven member 75, a plurality of spherical members 85, which are the principle direct torque transmitting members, and a means for mounting the armature and driven member with respect to the input shaft 20. The armature 60 and output member 75 are isolated rotationally as well as axially from any movement of the output shaft 20 by the use of a second annular friction free bearing member 90 with a shoulder portion 91 as well as an annular anti-friction spacer 95. The second annular bearing member 90 is coaxially mounted to the shaft directly adjacent the annular inner member 25. The resilient member armature 60 and driven or output member 75 are mounted to the second annular bearing member 90 and, therefore, remain coaxial with respect to the input shaft 20. The spherical members 85 are interposed the armature and output member. Location of the anti-friction thrust spacer is predetermined to obtain a workable relationship of the annular armature 60 with respect to the pole faces of the input means. A second retainer member 100 is mounted in a second groove 22 located in the input shaft 20 and establishes the workable relationship.

The annular armature member 60 is mounted coaxially with the second annular bearing member 90 and directly adjacent but spaced away from the pole faces 26, 36 of the inner 25 and outer 35 members. The armature has a radially outer surface 61 sufficient to engage the outer pole 36 of the input means. The inner most diameter 62 of the annular armature member is mounted to the second bearing sleeve member 90 and, further, has a shoulder portion 63 which provides housing for the resilient member and which permits the resilient member to act upon the armature when the armature is electromagnetically pulled into the pole faces. The outer most diameter 64 of the shoulder portion 63 of the armature is adapted to locate the resilient member radially and, further, adapted to provide an opposite face portion 65 adjacent the inner poles 26, 36 of the input means. The face portion 66 of the armature directly adjacent the output member 75 has a plurality of cross sectional conical recesses directly opposite a plurality of recesses located in the one end face portion 76 of the output member 75. The conical cross sections 67 have straight sides 68 to engage the spherical members 85. The conical cross section of the armature is directly symmetrical to the conical cross section in the output member. The included angle of the conical cross section in both the armature and the output member has been found to provide the best torque translation results at a suggested angle of 70° to 90°. It has been found in tests carried out that an eighty degree included angle is best to obtain the most efficient direct transfer of torque from the armature through the spherical members and to the output member. Although the face portion 66 of the armature is directly adjacent the output member, there is no surface contact whatsoever between the face portion 66 of the annular armature and the one end face portion 76 of the output member. The only connection between the armature and the output member is directly through the plurality of spherical members circumferentially and radially spaced between the armature and the output member. The armature 60 and output member 75 are at all times kept in contactive engagement with the plurality of spherical members 85 through the use of a resilient member 70 located within the shoulder portion 63 of the armature and bearing against the shoulder portion 91 of the second annular bearing member 90. The resilient member 70 is sufficiently biased axially to keep the armature member, plurality of spherical members and the output member in contactive engagement with the annular antifriction spacer 95 when the electromagnet is deenergized. As aforestated, the opposite face portion 65 of the armature member is directly adjacent but spaced away from the pole faces 26, 36 of the input means when the electromagnetic means is deenergized and when the torque transmitting device is at rest. In the deenergized state, the armature, plurality of spherical members, and the output member are axially as well as rotatably independent of the input means.

The output member 75, as earlier stated, is coaxially mounted to the the second annular member 90 and has a shoulder portion 91 at its one end which establishes a predetermined axial relationship for the location of the armature 60, plurality of spherical members 85, and output member 75, with respect to the anti-friction thrust spacer 95. The shoulder portion 91, in effect, locates the opposite face portion of the armature axially with respect to the pole faces 26, 36. The radially outer diameter 78 of the shoulder portion 77 is provided to clear the outer diameter of the anti-friction thrust spacer 95. The outer diameter 78 of the output or dirven member is of any sufficient configuration to conform to the specific requirement of any element attached thereto. The one end face portion 76 of the output member 75 has a plurality of conical cross sectional recesses 80 spaced radially outward from its inner diameter 82, and further, are located symmetrically opposite to the conical recesses 67 in the armature member 60. The cross sectional conical recesses have straight sides and are adapted to receive a plurality of spherical members 85.

The spherical members 85 are located in the symmetrically opposite conical recesses 67, 80 and are equally spaced around the periphery of the annular armature 60 and output member 75. It is preferable that three equally spaced members are used, but any number of recesses and spherical members may be used in an equally spaced relationship, depending on the torque that is desired to be translated.

It is to be noted that the relationship of the location of the armature, spherical members and output member will not be affected by any wear at the pole faces and the opposite face portion of the armature. This relationship will be maintained throughout the life of the torque transmitting device, and it is because of this constant relationship that dynamic characteristics over the life of the device are more stable than prior art devices.

Figure 2:
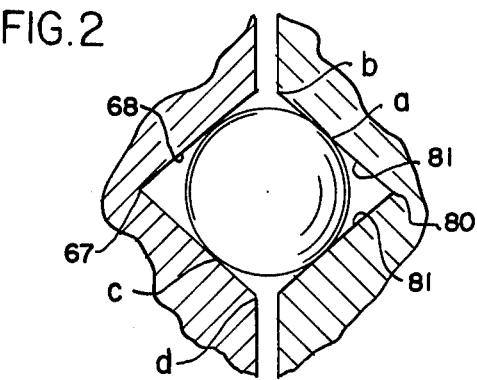
FIG. 2 is a fragmentary sectional view of the principle torque transmitting spherical members.

FIG. 2 is a fragmentary sectional view sharing the relationship of the torque translating members located in the conical recesses.

When axial movement between the armature and output members occurs, the spherical members will assume a position between points $a$ to $b$ and $c$ to $d$. It is noteworthy that at all times all torsional and axial forces are always translated normal to the tangent point of the straight surfaces of the conical recesses and, therefore, always provide self-centering of the spherical members. This condition exists providing the spherical members operate between points $a$-$b$ and $c$-$d$. When wear at the pole faces becomes so excessive as to permit the spherical members to travel beyond point $b$ or $d$, the clutch or braking device will break down and can no longer be used.

OPERATION

In operation, the armature is moved axially into engagement with the pole faces of the input means when the electromagnetic winding is energized. The magnetic engaging forces exerted on the armature are completely axial and, therefore, provide a surface to surface contact between the pole faces of the inner and outer members and the opposite face portion of the armature. As the armature moves axially toward the pole faces of the input means under the influence of the magnetic pull, the rotational velocity of the armature is increased by the dynamic condition of the input means. As the armature moves in an axial direction towards the pole faces, the distance between the armature and the output member will increase and the spherical members will be permitted to move along the straight sides of the conical recesses in the armature and output member.

Concurrently, after the armature moves axially toward the pole faces, the rotational velocity of the armature is increased by the dynamic condition of the input means. This relative rotational movement between the armature and the output member will also cause the spherical members to move along the straight surfaces of the conical recesses in both the armature as well as the output member. However, the output member is restricted from axial movement by the spacer ring as well as the retainer ring in the shaft. Therefore, only the armature will move axially in a direction towards the pole faces of the input means. The axial movement of the armature caused by the camming action between the output member and the armature results in a stronger engaging force between the armature and the pole faces of the electromagnet. The engaging force is further enhanced by the fact that the torque generated between the magnet body and the armature produces an equal reactive torque in the output member. Again, since the output member cannot move axially, the output member produces an equal but opposite reactive torque resulting in a further axial force which is transmitted back through the spherical members to the magnet body and becomes additive to the electromagnetic engaging force. The overall effect then is that relative rotational movement between the armature and the output member will generate an axial force which is proportional to the generated torque. This axial force is added to the magnet forces and, thereby, causes a net increase in the output torque of the translating device. The dynamic torque output of the device then will, therefore, be increased due to the action and reactionary forces of the torque transfer through the spherical members to the output member. This relationship between the magnet body, armature, and output member will be maintained until either the output member gains speeds equivalent to that of the armature or until the electromagnetic winding is de-energized. It is important to note that the only means of translating torque between the output and input means is though the spherical members located within the recesses of the output member as well as the armature member. Because of the use of the spherical members as torque translating means, the effect of frictional forces is very limited and, therefore, the result is a more stable dynamic torque translating device. All of the torque generated by the electromagnetic body and armature is translated directly to the output member through the spherical members. And, therefore, the spherical members provide a direct mechanical link between the output member and the input means to translate all of the torque from the input means to the output means.

Whenever the electromagnetic winding is de-energized, the torque generated between the magnet body and the armature no longer exists, therefore, the equal reactive torque of the output member will also disappear as well as the axial force causing the armature and output member to be separated. Under this mode of operation, the axial force generated by the resilient member is greater than the axial forces tending to separate the armature from the output member and, therefore, the spherical members will assume a rest position while the armature concurrently moves axially toward the output member. The rest position is a point where the spherical members are tangent to the straight lines of the conical inclines as defined in FIG. 2 by points $a$ and $c$. Under the influence of the axial force generated by the resilient member, the armature spherical members and output members will coast to a rest or stop position.

Any wear between the magnet body pole faces and the armature face will not adversely affect the operation of this torque translating device in that wear at the pole faces merely causes the armature to travel axially a longer distance before it engages the magnet body. This will not adversely affect the operation of the device since the straight sides of the conical recesses allows the device to always transfer torque in the same proportional relationship regardless of the wear exhibited between the pole faces and the armature. This relationship will always exist providing that the spherical members maintain a single point contact along the straight line of the conical recesses in the armature as well as the output member.

The final breakdown of the torque translating device will occur when the spherical members can no longer maintain the single point contact with the straight sides of the conical recesses in the respective faces of the armature and output member. In FIG. 2, this point is defined as point $b$ and $d$.

While the preferred embodiment of the invention has been disclosed, it will be apparent to those skilled in the art, that changes may be made to the invention as set forth in the claims and, in some instances, certain features of the invention may be used to advantage without corresponding use of other features. Accordingly, it is intended that the illustrative and descriptive materials herein be used to illustrate the principles of the invention and not to limit the scope thereof. While the form of the embodiment of the invention as herein disclosed constitutes a preferred form, it is to be understood that other forms might be adopted as may come within the scope of the claims which follow.

What is claimed is:

1. A torque transmitting device comprising:
   rotatable input means including portions thereof of magnetic material;
   means rotatably mounting said input means in an axially fixed location;
   output means coaxially disposed with said input means, said output means having an output member for positioning said output member with respect to said input means including abutment means axially locating said output member at a predetermined axial position thereby preventing axial movement away from said input means;
   means for translating torque interposed said input and output means, said translating means comprising:
      an annular armature coaxially disposed with said input and output means and axially moveable toward said input means;
      a plurality of substantially spherical members interposed said armature and said output member, said plurality of spherical members adapted to simultaneously engage said armature and said output member to provide a maximum direct transmission of torque from said input means to said output member through said spherical members;
      bias means urging said armature, said plurality of said spherical members, and said output member axially away from said input means, forcing said output member to said predetermined axial position against said abutment means and said armature away from said input means; and
      means for actuating said torque transmitting device, said actuating means disposed coaxially with said input means, said actuating means including electromagnetic means producing a circuitous magnetic flux through a flux path through said input means and said armature when said actuating means is energized drawing said armature into engagement with said portions of said input means against the influence of said bias means.

2. A torque transmitting device as claimed in claim 1 wherein the input means further comprises:
   a shaft;
   an annular inner member of magnetic material disposed coaxially with said shaft;

an annular outer member of magnetic material mounted concentric to said annular inner member for rotation therewith; and a ring member interposed said inner and outer members, said ring member having non-magnetic properties to enable the formation of a magnetic flux path between said inner and outer members without the passage of magnetic flux through said ring member.

3. A torque transmitting device as described in claim 2 wherein said ring member is of resilient material.

4. A torque transmitting device as claimed in claim 1 wherein the means for positioning said output member includes;

an annular anti-friction spacer member defining said abutment means disposed adjacent said output member;

means for bearing interposed said output member and said input means, said bearing means having a shoulder portion; and means for retaining said annular spacer member in contiguous relationship with said output member.

5. A torque transmitting device as claimed in claim 4 wherein said biasing means is interposed said shoulder portion of the bearing means and said armature for communication therewith.

6. A torque transmitting device as described in claim 1 wherein said biasing means includes a compression spring.

7. A torque transmitting electromagnetic device comprising:

input means, said input means being rotatable in an axially fixed location and having portions of magnetic material;

output means coaxially disposed with said input means, said output means having one end portion and an opposite end portion, said one end portion having a first plurality of recesses of substantially conical cross section, said output means further including abutment means axially locating said output means at a predetermined axial position thereby preventing axial movement away from said input means and further having means for translating torque interposed said input and output means, said translating means comprising:

an annular armature member coaxially disposed with said output and input means and axially moveable towards said input means, said armature having a face portion and an opposite face portion, said face portion of the armature being disposed adjacent but spaced away from said one end portion of said output means, said opposite face portion being of magnetic material and disposed adjacent but spaced away from said magnetic material portions of said input means for communication therewith, said face portion further having a second plurality of recesses of substantially conical cross section spaced radially outward from said annular armature member central axis, said substantially conical recesses disposed in opposing relationship with said substantially conical recesses in said one end portion of the output means; and a plurality of substantially spherical members disposed within said plurality of substantially conical recesses in said face portion of the armature and said plurality of substantially conical recesses on said one end portion of the output means, said plurality of spherical members adapted to simultaneously engage said armature and said one end portion of said output means to provide direct transmission of torque from said input means to said output means through said spherical members;

bias means urging said armature, said spherical members and said output means away from said input means and forcing said output means to said predetermined axial position against said abutment means; and actuating means for actuating said electromagnetic device, and actuating means disposed coaxially with said input means, said actuating means producing a circuitous magnetic flux through a flux path through said input means and said armature when said actuating means is energized, drawing said armature into engagement with said input means, said spherical members acting between the armature and the output means to create a direct coupling therebetween.

8. A torque transmitting device as claimed in claim 7 wherein the input means further comprises:

a shaft;

an annular inner member of magnetic material disposed coaxially with said shaft;

an annular outer member of magnetic material mounted concentric to said annular inner member for rotation therewith; and a ring member interposed said inner and outer members, said ring member having non-magnetic properties to enable the formation of a magnetic flux path between said inner and outer members.

9. A torque transmitting device as described in claim 8 wherein said ring memer is of resilient material.

10. A torque transmitting device as claimed in claim 7 wherein said actuating means further comprises:

second means for bearing interposed said input means and said actuating means; and means for retaining said actuating means to said input means.

11. A torque transmitting device as described in claim 7 wherein said biasing means includes a compression spring.

* * * * *

UNITED STATES PATENT OFFICE
CERTIFICATE OF CORRECTION

Patent No. 4,079,821  Dated March 21, 1978

Inventor(s) Donald L. Miller

It is certified that error appears in the above-identified patent and that said Letters Patent are hereby corrected as shown below:

Column 1, line 26, delete the word "displced" and insert the word ----displaced----.

Column 10, line 24, delete the word "and" and insert ----said----.

Column 10, line 47, delete the word "memer" and insert the word ----member----.

Signed and Sealed this

Twenty-second Day of August 1978

[SEAL]

Attest:

RUTH C. MASON
Attesting Officer

DONALD W. BANNER
Commissioner of Patents and Trademarks